(12) United States Patent
Bibbee

(10) Patent No.: US 6,711,514 B1
(45) Date of Patent: Mar. 23, 2004

(54) METHOD, APPARATUS AND PRODUCT FOR EVALUATING TEST DATA

(75) Inventor: Jeffrey N. Bibbee, Plano, TX (US)

(73) Assignee: Pintail Technologies, Inc., Plano, TX (US)

(*) Notice: Subject to any disclaimer, the term of this patent is extended or adjusted under 35 U.S.C. 154(b) by 0 days.

(21) Appl. No.: 09/576,330

(22) Filed: May 22, 2000

(51) Int. Cl.⁷ .................... G01N 37/00; G06F 19/00
(52) U.S. Cl. .................... 702/84; 702/81; 702/82; 702/182
(58) Field of Search .................... 702/81, 82, 84, 702/121, 123, 179, 182, 185; 714/2, 15, 36

(56) References Cited

U.S. PATENT DOCUMENTS 5,130,936 A * 7/1992 Sheppard et al. .......... 702/123
5,327,437 A * 7/1994 Balzer ........................ 714/736
6,480,808 B1 * 11/2002 Early et al. ................. 702/179

* cited by examiner

Primary Examiner—Bryan Bui
(74) Attorney, Agent, or Firm—Haynes and Boone, LLP

(57) ABSTRACT

Method, apparatus and product for analyzing a quality control regimen comprising one or more quality control tests, to determine if the tests are in statistical control, and therefore could be removed from the regimen or sampled at a different rate. On sample data relating to each of the tests, there is determined $C_{pi}$, a measure of the spread of the data, which is simply the ratio of the magnitude of the actual range of the data, to the magnitude of calculated statistical range of the data. There is also determined $C_{PKi}$, which is a measure of how close the spread of the data is to the upper or lower limit of the data. For convenience, the magnitude of $C_{pi}$ is represented as a vertical bar graph, with the value of $C_{PKi}$ shown as a position of the bar graph within normalized limits. Using $C_{pi}$ and $C_{PKi}$ decisions regarding removal of each the test can be made. One or more tests are then selected for removal or to have a different sampling rate, and "What If" scenarios then performed to see how the testing regimen would have performed without the test(s) or at the different sampling rate.

33 Claims, 16 Drawing Sheets

| TestNumber | TestDesc | LoLimit | HiLimit | Units | OptFlag | ResScal | LimScal | HlmScal | SpcSel |
|---|---|---|---|---|---|---|---|---|---|
| 1 | Test 1 | 0.002 | 0.01 | a | 14 | m | m | m | N |
| 2 | Test 2 | 0.003 | 0.007 | a | 14 | m | m | m | N |
| 3 | Test 3 | 0.0000464 | 0.0000539 | a | 14 | u | u | u | N |
| 4 | Test 4 | 189500 | 214050 | hz | 14 | | | | N |
| 5 | Test 5 | 4.5 | 5.2 | v | 14 | | | | N |
| 6 | Test 6 | 0.8 | 2 | v | 14 | | | | N |
| 7 | Test 7 | 1.786 | 3.8138 | v | 14 | | | | N |
| 8 | Test 8 | 2.075 | 2.128 | v | 14 | | | | N |
| 9 | Test 9 | 3.0765 | 3.1235 | v | 14 | | | | N |
| 10 | Test 10 | 95 | 790 | ohm | 14 | | | | N |

*Fig. 4*

| DeviceNumber | HardBin | LastTest | SpcChng |
|---|---|---|---|
| 1 | 1 | 10 | 0 |
| 2 | 1 | 10 | 0 |
| 3 | 1 | 10 | 0 |
| 4 | 1 | 10 | 0 |
| 5 | 1 | 10 | 0 |
| 6 | 1 | 10 | 0 |
| 7 | 1 | 10 | 0 |
| 8 | 3 | 4 | 0 |
| 9 | 1 | 10 | 0 |
| 10 | 1 | 10 | 0 |
| 11 | 1 | 10 | 0 |
| 12 | 1 | 10 | 0 |
| 13 | 1 | 10 | 0 |
| 14 | 1 | 10 | 0 |
| 15 | 1 | 10 | 0 |
| 16 | 1 | 10 | 0 |
| 17 | 1 | 10 | 0 |
| 18 | 1 | 10 | 0 |
| 19 | 1 | 10 | 0 |
| 20 | 1 | 10 | 0 |

Fig. 5

| DeviceNumber | TestNumber | TestResult | SpcFlow |
|---|---|---|---|
| 1 | 1 | 0.005187031 | FALSE |
| 1 | 2 | 0.005403125 | FALSE |
| 1 | 3 | 0.0000486 | FALSE |
| 1 | 4 | 195404.2 | FALSE |
| 1 | 5 | 4.99 | FALSE |
| 1 | 6 | 1.546875 | FALSE |
| 1 | 7 | 1.801719 | FALSE |
| 1 | 8 | 2.100547 | FALSE |
| 1 | 9 | 3.102578 | FALSE |
| 1 | 10 | 501.3281 | FALSE |
| 2 | 1 | 0.005199531 | FALSE |
| 2 | 2 | 0.005405625 | FALSE |
| 2 | 3 | 0.00004843 | FALSE |
| 2 | 4 | 207363.4 | FALSE |
| 2 | 5 | 4.99 | FALSE |
| 2 | 6 | 1.546875 | FALSE |
| 2 | 7 | 1.797344 | FALSE |
| 2 | 8 | 2.095547 | FALSE |
| 2 | 9 | 3.098828 | FALSE |
| 2 | 10 | 501.9531 | FALSE |
| 3 | 1 | 0.005159531 | FALSE |
| 3 | 2 | 0.005194531 | FALSE |
| 3 | 3 | 4.95233E-05 | FALSE |
| 3 | 4 | 192732.4 | FALSE |
| 3 | 5 | 4.995 | FALSE |
| 3 | 6 | 1.546875 | FALSE |
| 3 | 7 | 1.803594 | FALSE |
| 3 | 8 | 2.099922 | FALSE |
| 3 | 9 | 3.101328 | FALSE |
| 3 | 10 | 501.9531 | FALSE |
| 4 | 1 | 0.005123281 | FALSE |
| 4 | 2 | 0.005273281 | FALSE |
| 4 | 3 | 0.0000484 | FALSE |
| 4 | 4 | 195690 | FALSE |
| 4 | 5 | 5.01 | FALSE |
| 4 | 6 | 1.609375 | FALSE |
| 4 | 7 | 1.801719 | FALSE |
| 4 | 8 | 2.101797 | FALSE |
| 4 | 9 | 3.101953 | FALSE |
| 4 | 10 | 506.9531 | FALSE |
| 5 | 1 | 0.005107031 | FALSE |
| 5 | 2 | 0.005318281 | FALSE |
| 5 | 3 | 4.76267E-05 | FALSE |
| 5 | 4 | 199656 | FALSE |
| 5 | 5 | 4.99 | FALSE |
| 5 | 6 | 1.515625 | FALSE |
| 5 | 7 | 1.804219 | FALSE |
| 5 | 8 | 2.102422 | FALSE |
| 5 | 9 | 3.102578 | FALSE |
| 5 | 10 | 501.3281 | FALSE |
| 6 | 1 | 0.005042187 | FALSE |
| 6 | 2 | 0.005202031 | FALSE |
| 6 | 3 | 0.0000461 | FALSE |
| 6 | 4 | 193036.7 | FALSE |
| 6 | 5 | 4.99 | FALSE |
| 6 | 6 | 1.578125 | FALSE |
| 6 | 7 | 1.802969 | FALSE |
| 6 | 8 | 2.101797 | FALSE |
| 6 | 9 | 3.103203 | FALSE |
| 6 | 10 | 506.3281 | FALSE |

Fig. 6A

| | | | |
|---|---|---|---|
| 7 | 1 | 0.005165781 | FALSE |
| 7 | 2 | 0.005364531 | FALSE |
| 7 | 3 | 4.82967E-05 | FALSE |
| 7 | 4 | 194622.8 | FALSE |
| 7 | 5 | 4.99 | FALSE |
| 7 | 6 | 1.515625 | FALSE |
| 7 | 7 | 1.804219 | FALSE |
| 7 | 8 | 2.101797 | FALSE |
| 7 | 9 | 3.104453 | FALSE |
| 7 | 10 | 490.0781 | FALSE |
| 8 | 1 | 0.005155781 | FALSE |
| 8 | 2 | 0.005365781 | FALSE |
| 8 | 3 | 0.0000475 | FALSE |
| 8 | 4 | 189407.6 | FALSE |
| 8 | 5 | 4.985 | FALSE |
| 8 | 6 | 1.515625 | FALSE |
| 8 | 7 | 1.800469 | FALSE |
| 8 | 8 | 2.103047 | FALSE |
| 8 | 9 | 3.105078 | FALSE |
| 8 | 10 | 498.8281 | FALSE |
| 9 | 1 | 0.005147031 | FALSE |
| 9 | 2 | 0.005370625 | FALSE |
| 9 | 3 | 0.00004864 | FALSE |
| 9 | 4 | 201900.2 | FALSE |
| 9 | 5 | 4.995 | FALSE |
| 9 | 6 | 1.515625 | FALSE |
| 9 | 7 | 1.801719 | FALSE |
| 9 | 8 | 2.099297 | FALSE |
| 9 | 9 | 3.102578 | FALSE |
| 9 | 10 | 495.625 | FALSE |
| 10 | 1 | 0.005223281 | FALSE |
| 10 | 2 | 0.005464375 | FALSE |
| 10 | 3 | 5.09533E-05 | FALSE |
| 10 | 4 | 201289.2 | FALSE |
| 10 | 5 | 5 | FALSE |
| 10 | 6 | 1.515625 | FALSE |
| 10 | 7 | 1.799844 | FALSE |
| 10 | 8 | 2.102422 | FALSE |
| 10 | 9 | 3.103828 | FALSE |
| 10 | 10 | 491.875 | FALSE |
| 11 | 1 | 1.005259531 | FALSE |
| 11 | 2 | 1.005304375 | FALSE |
| 11 | 3 | 0.0000489 | FALSE |
| 11 | 4 | 197497 | FALSE |
| 11 | 5 | 4.995 | FALSE |
| 11 | 6 | 1.54688E+00 | FALSE |
| 11 | 7 | 1.807969 | FALSE |
| 11 | 8 | 2.109297 | FALSE |
| 11 | 9 | 3.114453 | FALSE |
| 11 | 10 | 498.125 | FALSE |
| 12 | 1 | 0.005150781 | FALSE |
| 12 | 2 | 0.005375625 | FALSE |
| 12 | 3 | 1.00004887 | FALSE |
| 12 | 4 | 198166.9 | FALSE |
| 12 | 5 | 4.995 | FALSE |
| 12 | 6 | 1.515625 | FALSE |
| 12 | 7 | 1.801094 | FALSE |
| 12 | 8 | 2.101797 | FALSE |
| 12 | 9 | 3.10070E+00 | FALSE |
| 12 | 10 | 500.625 | FALSE |

Fig. 6B

| 13 | 1 | 0.005180781 | FALSE |
|---|---|---|---|
| 13 | 2 | 0.005294531 | FALSE |
| 13 | 3 | 0.0000487 | FALSE |
| 13 | 4 | 196079.9 | FALSE |
| 13 | 5 | 5 | FALSE |
| 13 | 6 | 1.546875 | FALSE |
| 13 | 7 | 1.805469 | FALSE |
| 13 | 8 | 2.104297 | FALSE |
| 13 | 9 | 3.105703 | FALSE |
| 13 | 10 | 502.5 | FALSE |
| 14 | 1 | 0.005070781 | FALSE |
| 14 | 2 | 0.005234531 | FALSE |
| 14 | 3 | 0.0000471 | FALSE |
| 14 | 4 | 197764.8 | FALSE |
| 14 | 5 | 4.99500E+00 | FALSE |
| 14 | 6 | 1.578125 | FALSE |
| 14 | 7 | 1.794844 | FALSE |
| 14 | 8 | 2.094297 | FALSE |
| 14 | 9 | 3.090078 | FALSE |
| 14 | 10 | 513.125 | FALSE |
| 15 | 1 | 0.005105781 | FALSE |
| 15 | 2 | 0.005328125 | FALSE |
| 15 | 3 | 4.87433E-05 | FALSE |
| 15 | 4 | 193823.7 | FALSE |
| 15 | 5 | 4.995 | FALSE |
| 15 | 6 | 1.484375 | FALSE |
| 15 | 7 | 1.799844 | FALSE |
| 15 | 8 | 2.09992E+00 | FALSE |
| 15 | 9 | 3.100078 | FALSE |
| 15 | 10 | 497.5 | FALSE |

| 16 | 1 | 0.005185781 | FALSE |
|---|---|---|---|
| 16 | 2 | 0.005378125 | FALSE |
| 16 | 3 | 0.00004868 | FALSE |
| 16 | 4 | 193411.7 | FALSE |
| 16 | 5 | 4.985 | FALSE |
| 16 | 6 | 1.546875 | FALSE |
| 16 | 7 | 1.806719 | FALSE |
| 16 | 8 | 2.107422 | FALSE |
| 16 | 9 | 3.108828 | FALSE |
| 16 | 10 | 507.5 | FALSE |
| 17 | 1 | 0.005092031 | FALSE |
| 17 | 2 | 0.005267031 | FALSE |
| 17 | 3 | 0.0000475 | FALSE |
| 17 | 4 | 204345.2 | FALSE |
| 17 | 5 | 4.975 | FALSE |
| 17 | 6 | 1.546875 | FALSE |
| 17 | 7 | 1.801094 | FALSE |
| 17 | 8 | 2.103047 | FALSE |
| 17 | 9 | 3.102578 | FALSE |
| 17 | 10 | 511.25 | FALSE |
| 18 | 1 | 0.005099531 | FALSE |
| 18 | 2 | 0.005323125 | FALSE |
| 18 | 3 | 0.00004732 | FALSE |
| 18 | 4 | 199729 | FALSE |
| 18 | 5 | 5 | FALSE |
| 18 | 6 | 1.484375 | FALSE |
| 18 | 7 | 1.796094 | FALSE |
| 18 | 8 | 2.094297 | FALSE |
| 18 | 9 | 3.093203 | FALSE |
| 18 | 10 | 501.875 | FALSE |

Fig. 6C

| | | | |
|---|---|---|---|
| 19 | 1 | 0.005128281 | FALSE |
| 19 | 2 | 0.005343125 | FALSE |
| 19 | 3 | 0.00004843 | FALSE |
| 19 | 4 | 200148.8 | FALSE |
| 19 | 5 | 4.99 | FALSE |
| 19 | 6 | 1.515625 | FALSE |
| 19 | 7 | 1.787344 | FALSE |
| 19 | 8 | 2.093672 | FALSE |
| 19 | 9 | 3.093828 | FALSE |
| 19 | 10 | 499.375 | FALSE |
| 20 | 1 | 0.005152031 | FALSE |
| 20 | 2 | 0.005356875 | FALSE |
| 20 | 3 | 0.0000475 | FALSE |
| 20 | 4 | 199560.8 | FALSE |
| 20 | 5 | 4.99 | FALSE |
| 20 | 6 | 1.546875 | FALSE |
| 20 | 7 | 1.807344 | FALSE |
| 20 | 8 | 2.108047 | FALSE |
| 20 | 9 | 3.113828 | FALSE |
| 20 | 10 | 496.875 | FALSE |

| TestNumber | 1 | 2 | 3 | 4 | 5 | 6 | 7 | 8 | 9 | 10 |
|---|---|---|---|---|---|---|---|---|---|---|
| TestDesc | Test1 | Test2 | Test3 | | | | | | | |
| LoLimit | 0.002 | 0.003 | 4.64E-05 | 189500 | 4.5 | 0.8 | 1.786 | 2.075 | 3.0765 | 95 |
| HiLimit | 0.01 | 0.007 | 5.39E-03 | 214050 | 5.2 | 2 | 1.8138 | 2.128 | 3.1235 | 790 |
| Units | a | a | a | hz | v | v | v | v | v | ohm |
| OptFlag | 14 | 14 | 14 | 14 | 14 | 14 | 14 | 14 | 14 | 14 |
| ResScal | m | m | u | | | | | | | |
| LimScal | m | m | u | | | | | | | |
| HlmScal | m | m | u | | | | | | | |
| Device# | | | | | | | | | | |
| 1 | 5.19E-03 | 5.40E-03 | 4.86E-05 | 195404.2 | 4.99 | 1.546875 | 1.801719 | 2.100547 | 3.102578 | 501.3281 |
| 2 | 5.20E-03 | 5.41E-03 | 4.84E-05 | 207363.4 | 4.99 | 1.546875 | 1.797344 | 2.095547 | 3.093828 | 501.9531 |
| 3 | 5.16E-03 | 5.19E-03 | 4.95E-05 | 192732.4 | 4.995 | 1.546875 | 1.803594 | 2.099922 | 3.101328 | 501.9531 |
| 4 | 5.12E-03 | 5.27E-03 | 4.84E-05 | 195690 | 5.01 | 1.609375 | 1.801719 | 2.101797 | 3.101953 | 506.9531 |
| 5 | 5.11E-03 | 5.32E-03 | 4.76E-05 | 199656 | 4.99 | 1.515625 | 1.804219 | 2.102422 | 3.102578 | 501.3281 |
| 6 | 5.04E-03 | 5.20E-03 | 4.61E-05 | 193036.7 | 4.99 | 1.578125 | 1.802969 | 2.101797 | 3.103203 | 506.3281 |
| 7 | 5.17E-03 | 5.36E-03 | 4.83E-05 | 194622.8 | 4.99 | 1.515625 | 1.804219 | 2.101797 | 3.104453 | 490.0781 |
| 8 | 5.16E-03 | 5.37E-03 | 4.75E-05 | 189407.6 | 4.985 | 1.515625 | 1.800469 | 2.103047 | 3.105078 | 498.8281 |
| 9 | 5.15E-03 | 5.37E-03 | 4.86E-05 | 201900.2 | 4.995 | 1.515625 | 1.801719 | 2.099297 | 3.102578 | 495.625 |
| 10 | 5.22E-03 | 5.46E-03 | 5.10E-05 | 201289.2 | 5 | 1.515625 | 1.799844 | 2.102422 | 3.103828 | 491.875 |
| 11 | 5.26E-03 | 5.30E-03 | 4.89E-05 | 197497 | 4.995 | 1.546875 | 1.807969 | 2.109297 | 3.114453 | 498.125 |
| 12 | 5.15E-03 | 5.38E-03 | 4.89E-05 | 198166.9 | 4.995 | 1.515625 | 1.801094 | 2.101797 | 3.100703 | 500.625 |
| 13 | 5.18E-03 | 5.29E-03 | 4.87E-05 | 196079.9 | 5 | 1.546875 | 1.805469 | 2.104297 | 3.105703 | 502.5 |
| 14 | 5.07E-03 | 5.23E-03 | 4.71E-05 | 197764.8 | 4.995 | 1.578125 | 1.794844 | 2.094297 | 3.090078 | 513.125 |
| 15 | 5.11E-01 | 5.33E-03 | 4.87E-05 | 193823.7 | 4.995 | 1.484375 | 1.799844 | 2.099922 | 3.100078 | 497.5 |
| 16 | 5.19E-03 | 5.39E-03 | 4.87E-05 | 193411.7 | 4.985 | 1.546875 | 1.806719 | 2.107422 | 3.108828 | 507.5 |
| 17 | 5.09E-03 | 5.28E-03 | 4.75E-05 | 204345.2 | 4.975 | 1.546875 | 1.801094 | 2.103047 | 3.102578 | 511.25 |
| 18 | 5.10E-03 | 5.32E-03 | 4.73E-05 | 199729 | 5 | 1.484375 | 1.796094 | 2.094297 | 3.093203 | 501.875 |
| 19 | 5.13E-03 | 5.34E-03 | 4.84E-05 | 200148.8 | 4.99 | 1.515625 | 1.797344 | 2.093672 | 3.093828 | 499.375 |
| 20 | 5.15E-03 | 5.36E-03 | 4.75E-05 | 199560.8 | 4.99 | 1.546875 | 1.807344 | 2.108047 | 3.113828 | 496.875 |

|  | t1 | t2 | t3 | t4 | t5 | t6 | t7 | t8 | t9 | t10 |
|---|---|---|---|---|---|---|---|---|---|---|
| LSL | 0.002 | 0.003 | 4.64E-05 | 189500 | 4.5 | 0.8 | 1.786 | 2.075 | 3.0765 | 95 |
| USL | 0.01 | 0.007 | 5.39E-05 | 214050 | 5.2 | 2 | 1.8138 | 2.128 | 3.1235 | 790 |
| Mean | 0.005147 | 0.005328 | 4.83E-05 | 197604 | 4.99275 | 1.535938 | 1.801782 | 2.101235 | 3.102234 | 501.25 |
| Min | 0.005042 | 0.005195 | 4.61E-05 | 189407.6 | 4.975 | 1.484375 | 1.794844 | 2.093672 | 3.090078 | 490.0781 |
| Max | 0.00526 | 0.005464 | 5.10E-05 | 207363.4 | 5.01 | 1.609375 | 1.807969 | 2.109297 | 3.114453 | 513.125 |
| Sigma | 5.25E-05 | 6.94E-05 | 1.02E-06 | 0.007159 | 0.030878 | 0.003655 | 0.004372 | 0.006219 | 5.796677 | |
| Cp | 25.39065 | 9.600781 | 1.231222 | 0.94583 | 16.29671 | 6.477163 | 1.267653 | 2.02035 | 1.259664 | 19.98271 |
| Cpk | 19.97476 | 8.024416 | 0.620755 | 0.624442 | 9.649979 | 5.009681 | 1.096064 | 2.000108 | 1.139902 | 16.60434 |

| TestNumber | t1 | t2 | t3 | t4 | t5 | t6 | t7 | t8 | t9 | t10 |
|---|---|---|---|---|---|---|---|---|---|---|
| Norm +3 Sig | 0.413041 | 0.634175 | 0.65819 | 0.858739 | 0.73461 | 0.690476 | 0.962109 | 0.742472 | 0.944468 | 0.609554 |
| Norm -3 Sig | 0.373656 | 0.530017 | 0.154012 | 0.198534 | 0.673248 | 0.536087 | 0.17325 | 0.247509 | 0.150606 | 0.559511 |
| Norm Mean | 0.393349 | 0.5829096 | 0.252089 | 0.330102 | 0.803929 | 0.613281 | 0.56768 | 0.494991 | 0.547537 | 0.584532 |

*Fig. 8*

METHOD, APPARATUS AND PRODUCT FOR EVALUATING TEST DATA

BACKGROUND OF THE INVENTION

1. Field of the Invention

The present invention relates to methods, apparatus and products for quality control. In another aspect, the present invention relates to methods, apparatus and products for analyzing a quality control regimen. In even another aspect, the present invention relates to methods, apparatus and products for analyzing a quality control regimen comprising one or more quality control tests and determining which tests can be eliminated from the regimen or sampled at a different rate. In still another aspect, the present invention relates to methods, apparatus, and products for analyzing a quality control regimen comprising one or more quality control tests, determining which tests can be eliminated from the regimen or sampled differently, and then conducting "what if" scenarios on the data absent the eliminated tests or at the different sampling rate.

2. Description of the Related Art

Statistical sampling is generally employed where there is a concern with quality control. As a non-limiting common example, electronic components or goods are generally subject to a number of performance tests which are selected and designed to provide an indication of the quality of the components or goods. As it is generally impractical to test each and every component or good, resort is made to statistical sampling.

Statistical sampling generally involves taking small samples from a larger sized grouping, and making a generalization regarding the quality of the entire grouping based on the small sample. The number of samples taken, the size of the samples taken, and the type and number of quality control tests conducted on the samples are all a function of the desired level of confidence required for the quality control process. A cost benefit analysis is generally also applied to the quality control process, that is, the cost of the quality control process must not outweigh the benefits achieved.

For example, for a lot of 5,000 electronic components, a sample of 10 components might be selected on which to run 7 quality control tests. The decision for the entire lot of 5000 components, whether it be "passing" "failing", "conditional acceptance", "further testing", or some other choice, will depend upon the outcome of the seven tests on those 10 sample components.

In general, for any given test(s), the level of confidence regarding the quality can be increased or decreased by respectively increasing or decreasing the sample size selected from the lot. Depending upon the circumstances, anywhere from a small fraction, to a larger fraction to 100 percent of the lot may be tested.

Additionally, while the level of confidence may also be effected by conducting more or fewer quality control tests, the effect on the level of confidence is not so easily determined, as each test contributes differently to the confidence level, and determining that contribution is difficult.

Ideally, after a quality control testing regimen is implemented, inquiry should be made of the historical data as to whether any of the tests can be eliminated, and/or if additional tests should be added. For illustration, referring again to the above example of a 5000 component lot, from which a sample of 10 components is subjected to 7 quality control tests, it could be that tests 1–4 yield 98% of the rejected components, test 5 yields 1.5%, test 6 yields 0.49%, and test 7 yields 0.01%.

Depending upon the level of confidence required, it might be possible to eliminate one or more tests, and the likely candidates for elimination in order would be test 7, test 6, and then test 5. However, merely because a test finds the fewest number of failures, doesn't necessarily mean that it may be eliminated. The selection of which test to eliminate from the quality control testing regimen is not so straight forward.

Furthermore, it may be possible to utilize one or more of the tests on less than all of the selected samples. For example, in the above, perhaps test 7 needs to be conducted on only 5 of the 10 samples.

There is a need in the art for apparatus, methods and products for analyzing test data.

There is another need in the art for apparatus, methods and products for analyzing test data from a multiplicity of tests.

There is even another need in the art for apparatus, methods and products for analyzing test data from a multiplicity of tests to determine the validity of each test of the multiplicity of tests.

These and other needs in the art will become apparent to those of skill in the art upon review of this specification, including its drawings and claims.

SUMMARY OF THE INVENTION

It is an object of the present invention to provide for apparatus, methods and products for analyzing test data.

It is another object of the present invention to provide for apparatus, methods and products for analyzing test data from a multiplicity of tests.

It is even another object of the present invention to provide for analyzing test data from a multiplicity of tests to determine the validity of each test of the multiplicity of tests.

These and other objects of the present invention will become apparent to those of skill in the art upon review of this specification, including its drawings and claims.

According to one embodiment of the present invention, there is provided a method for analyzing a quality control regimen comprising M quality control tests $T_i$ wherein i is=M a finite positive integer $\geq 1$, wherein each quality control test $T_i$ is applied to a population P at a sampling rate $R_i$ generating test data $D_i$. The method generally includes determining for each of the quality control tests $T_i$, a $C_{Pi}$ and $C_{PKi}$, wherein $C_{pi}$ is a measure of the spread of data $D_i$, and wherein $C_{PK}$ is a measure of the magnitude of how close $\mu_i$ is to the closer of $U_i$ or $L_i$, wherein $U_i$, $L_i$, and $\mu_i$, are respectively, the upper limit, lower limit, and mean for $D_i$. Optionally, the method further includes adjusting one or more of $R_i$, $U_i$ or $L_i$, for at least one of the tests $T_i$. In a further embodiment of this embodiment, the method further comprising repeating the determination above. In even a further embodiment of this embodiment, the method includes iteratively repeating the determination and adjusting steps until $C_{pi}$ and $C_{pki}$ are at desired values.

In still a further embodiment of this embodiment, $C_{pi}=(U_i-L_i)/(2N\sigma_i)$ and $C_{PKi}=\{[(\text{lesser of } |U_i-\mu_i| \text{ or } |L_i-\mu_i|)]/(N\sigma_i/2)\}$, wherein $\sigma_i$ is a standard deviation for $D_i$. In yet a further embodiment of this embodiment, the method includes graphically displaying $C_{Pi}$ and $C_{PKi}$, with the magnitude of $C_{pi}$ represented by a bar graph, with the magnitude of $C_{PKi}$ represented as a position of the bar on the graph, and with $\mu_i$ represented as a marking on the bar.

According to another embodiment of the present invention, there is provided an apparatus for analyzing a quality control regimen comprising M quality control tests $T_i$ wherein i is=M a finite positive integer $\geq 1$, wherein each quality control test $T_i$ is applied to a population P at a sampling rate $R_i$ generating test data $D_i$. Optionally, the apparatus includes a processor provided with instructions that when executed cause the processor to determine for each of the quality control tests $T_i$, a $C_{Pi}$ and $C_{PKi}$, wherein $C_{pi}$ is a measure of the spread of data $D_i$, and wherein $C_{PK}$ is a measure of the magnitude of how close $\mu_i$ is to the closer of $U_i$ or $L_i$, wherein $U_i$, $L_i$, and $\mu_i$, are respectively, the upper limit, lower limit, and mean for $D_i$, and also includes an input device for providing to the processor updated values for one or more of $R_i$, $U_i$ or $L_i$, for at least one of the tests $T_i$. In a further embodiment of the instructions when executed further cause the processor to determine for each of the quality control tests $T_i$, updated values for $C_{Pi}$ and $C_{PKi}$, based on updated values for one or more of $R_i$, $U_i$ or $L_i$. In even a further embodiment of the present invention, the instructions when executed further cause the processor to repeatedly update values for $C_{Pi}$ and $C_{PKi}$, based on updated values for one or more of $R_i$, $U_i$ or $L_i$, until the updated values for $C_{pi}$ and $C_{pki}$ reach a desired value. In still a further embodiment of the present invention, $C_{pi}=(U_i-L_i)/(2N\sigma_i)$ and $C_{PKi}=\{[(\text{lesser of }|U_i-\mu_i|\text{ or }|L_i-\mu_i|)]/(N\sigma_i/2)\}$, wherein $\sigma_i$ is a standard deviation for $D_i$. In yet a further embodiment of the present invention, the apparatus comprises an output device for graphically displaying $C_{Pi}$ and $C_{PKi}$, with the magnitude of $C_{pi}$ represented by a bar graph, with the magnitude of $C_{PKi}$ represented as a position of the bar on the graph, and with $\mu_i$ represented as a marking on the bar.

According to even another embodiment of the present invention, the processor is provided computer-readable storage medium having stored thereon a plurality of instructions for analyzing a quality control regimen comprising M quality control tests $T_i$ wherein i is=M a finite positive integer $\geq 1$, wherein each quality control test $T_i$ is applied to a population P at a sampling rate $R_i$ generating test data $D_i$.

According to still another embodiment of the present invention, there is provided a propagated signal comprising a plurality of instructions for analyzing a quality control regimen comprising M quality control tests $T_i$ wherein i is=M a finite positive integer $\geq 1$, wherein each quality control test $T_i$ is applied to a population P at a sampling rate $R_i$ generating test data $D_i$.

Both the medium and the signal comprises instructions to determine for each of the quality control tests $T_i$, a $C_{Pi}$ and $C_{PKi}$, wherein $C_{pi}$ is a measure of the spread of data $D_i$, and wherein $C_{PK}$ is a measure of the magnitude of how close $\mu_i$ is to the closer of $U_i$ or $L_i$, wherein $U_i$, $L_i$, and $\mu_i$, are repectively, the upper limit, lower limit, and mean for $D_i$, and instructions for providing to the processor updated values for one or more of $R_i$, $U_i$ or $L_i$, for at least one of the tests $T_i$.

These and other embodiments of the present invention will become apparent to those of skill in the art upon review of this specification, including its drawings and claims.

BRIEF DESCRIPTION OF THE DRAWINGS

FIG. 4 is Header and Statistics table 141 of the Example after conversion from STDF file 100.

FIG. 5 is Binning Table 142 of the Example after conversion from STDF file 100.

FIGS. 6A, 6B, 6C and 6D are the Parametric Result Table 143 of the Example after conversion from STDF file 100.

FIG. 7 is Data Spreadsheet 181 of the Example after conversion from database 140.

FIG. 8 is Statistics Spreadsheet 182 of the Example after conversion from database 140.

DETAILED DESCRIPTION OF THE INVENTION

Overall View Of Analysis Method/System

The present invention includes analyzing a quality control test regimen having one or more tests, and determining the importance or contribution of each test of the regimen to the level of assurance provided by the test regimen. Should the analysis suggest changes to the quality control regimen, for example, that one or more of the tests are within statistic control and could be eliminated, sampled at different rates, or suggest adjustment to other parameters, then the present invention also includes running "what if" scenarios, to determine the effect of those suggested changes on the regimen. The present invention also includes any number of iterations of "what if" scenarios to implement any number of possible changes to the quality control regimen.

Figure 1:
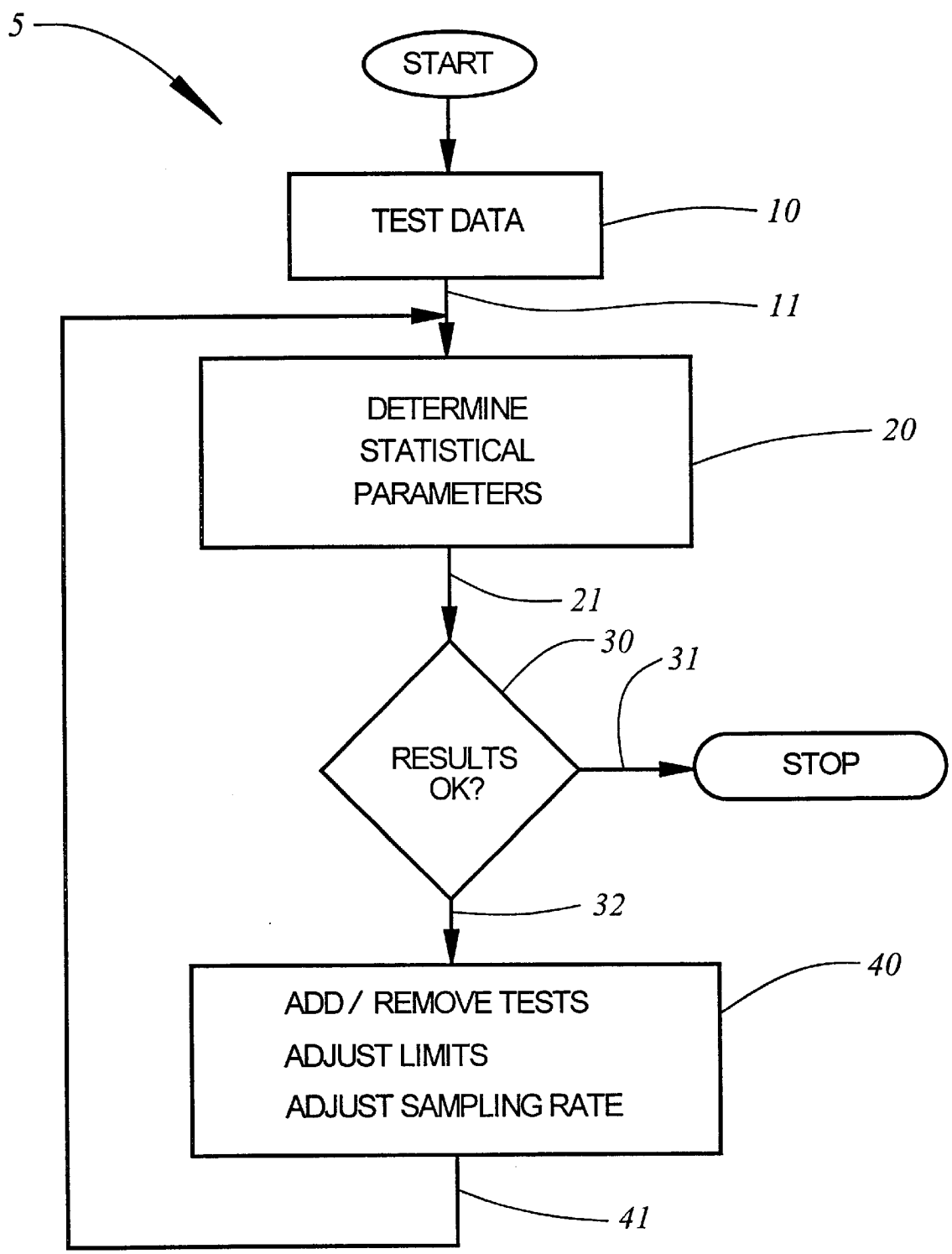
FIG. 1, a high level block diagram of one embodiment of the analysis method/system 5 of the present invention.

The present invention will now be described by reference to FIG. 1, a high level flowchart of one embodiment of the analysis method/system 5 of the present invention. Generally, program flow 11 from input system 10 provides test data to statistical analysis block 20 which determines various statistical parameters for the test data, with program flow 21 to decision block 30 for determining the quality of the data from the various determined statistical parameters, with program flow 31 exiting the analysis if the quality is "ok" or if "not ok" then program flow 32 to "what if" scenario block 40 for changing various parameters, with program flow 41 iterated back for a repeat of statistical analysis block 20 and decision block 30 for analysis of the results in view of the proposed changes. Of course, these "what if" scenarios may be continued until the results viewed in decision block 30 are "ok."

In the practice of the present invention, the quality control regimen will comprise M number of tests, wherein M is generally any positive integer, which are conducted on S samples selected from a population P. While it is possible to utilize the present invention to analyze a quality control regimen having only one test (i.e., M=1), the present invention is believed to be more useful where M is greater than 2.

One or more steps of the method of the present invention is preferably computer implemented.

The apparatus of the present invention is preferably a computer system, along with necessary attendant hardware and software, configured to carry out the method of the present invention.

The product of the present invention includes computer readable media comprising instructions, or a data signal embodied in a carrier wave comprising instructions, said instructions which when carried out on a computer will implement that method of the present invention.

Input of Data to Analysis Method/System

Block 10 is generally a data input system for input of test data from the tests of the quality control regimen. It is generally understood that the providing of data from the various tests of the quality control regimen, to processing method/system 5 of the present invention is well within the skill of the art, and any suitable methods and apparatus may be utilized.

Specifically, the gathering of raw test data from the various tests and the data's subsequent input into the analysis system 5, may generally be accomplished utilizing any suitable method and apparatus. Preferably, the gathering of raw test data and its subsequent input into method/system 5 is automated as much as possible. Of course, the extent to which the data gathering is automated, will depend upon available technology.

To provide a non-limiting example, data gathering may be accomplished by a technician who may read test data and subsequently keyboard such into system 5. As another non-limiting example, the various test apparatus may output digital data onto readable media containing a data file that is subsequently provided to system 5. As even another non-limiting example, the various test apparatus may output the data as a file to globally shared storage media (i.e., networked hard drive), or may transmit a data file via wire, cable or wireless transmission directly to system 5.

In the practice of the present invention, test data may generally be arranged in any suitable format. The present invention is not to be limited to the use of any particular format, as it is believed that any suitable format is acceptable. An example of a suitable data input format includes STDF (Standard Test Data Format), a public domain binary file format established to standardize the data log output from Automatic Test Equipment (ATE) during the testing of integrated circuits.

The data may contain any type of information regarding the samples, such as sample number, test number, test description, upper and lower limits, units of the test, a result scaler for the tests, and what is known to those of skill in the quality control art as "binning data."

As a sample is tested, it is placed in a "bin" (which may be a physical bin and/or a data accounting bin), with each bin corresponding to the pass/fail results for each test. For example, "bin 1" is generally reserved for samples which pass all quality control tests, with increasing bin number corresponding to worse samples or different failure mechanisms. Some bins may also be reserved for sample defects which may be corrected or sorted by performance, whereas other bins are for irrepairable samples.

It should also be understood that while the data may be referred to as being in a "file", the data may physically reside in one file or in a number of files which may or may not be associated, and which may or may not be stored on the same physical hardware.

It is also possible, that the test data will be transferred from one format to other formats. For example, the data may be input into system 5 as STDF data, and then transferred to a format utilized by any number of commercially available spreadsheet or database programs, non-limiting examples of which include spreadsheet formats for Microsoft Excel, Lotus 1-2-3, Corel Quattro Pro, or database formats for Microsoft Access, Corel Paradox, or oracle.

Statistical Parameters

Method/system 5 of the present invention also generally includes statistical analysis block 20 for determining any number of desired statistical parameters regarding the test data.

While it is possible to derive software for determining the desired statistical parameters, it is most convenient to utilize any of the commercially available database or spreadsheet programs, non-limiting examples of which include spreadsheet software such as Microsoft Excel, Lotus 1-2-3, or Corel Quattro Pro, or database programs such as Microsoft Access or Corel Paradox, Oracle.

It should be understood that the test data comprises test data that is specific to each test. Generally, the test data will comprise M subsets of test data each corresponding to one of the M tests.

For each of these M tests, the data is sampled at a sampling rate R, which may be expressed in terms the number of samples S per population P of the item of interest or as a percentage of population P sampled. For example in the manufacture of lots of 1000 of the proverbial "widget," R could be expressed in units of 100 samples per 1000 widget lot or could be expressed as 10% sampling. While traditionally, a quality control regimen consists of taking a number of samples S from a lot, and then conducting all M tests on all of the samples, the present invention contemplates same or different R's for each of the M tests, allowing for a partial reduction in the use of one or more of the M tests. For example, it could be that a first test is conducted at 10% sampling, and a second test is conducted at 5% sampling, thus allowing for a 50% elimination of the second test. Such a reduction, while not eliminating the second test, does allow for a reduction in the testing cost and time. It should be clear that the maximum reduction of the sampling rate, that is down to 0% sampling or 0 per lot, results in the elimination of the test.

The present invention includes determining a value $C_P$ for each of the M subsets of data of the M tests, wherein $C_P$ is a measure of the spread of the data, more preferably a measure of how the magnitude of the actual range of the data (i.e., "Range, Actual" or "$R_A$") relates to the magnitude of the calculated statistical spread of the data (i.e, "Range, Calculated Statistical" or "$R_{CS}$")

If it is desired to compare the data spread for one test with the data spread for other tests, it is preferred that $C_P$ be normalized. While $C_P$ could be normalized to almost any value, it is most conveniently normalized to range from 0 to 1 because the calculated statistical range ("$R_{CS}$") and the actual range ("$R_A$") should be about equal, and the ratio easily normalized from 0 to 1.

The magnitude of the actual range of the data ("$R_A$") is generally determined by taking the difference between the upper (U) and lower (L) values of the data, that is, $R_A = U - L$.

Regarding the magnitude of the calculated statistical range ("$R_{CS}$"), reference is made to each set of test data having mean $\mu$ and standard deviation $\sigma$, and having a sampling distribution that is approximately normal. The range for each set of data is then $\mu - N\sigma$ to $\mu + N\sigma$, with the confidence of test data lying in the interval, increasing with increasing N.

For example, for test data relating to each test as described having mean $\mu$ and standard deviation $\sigma$, and having a sampling distribution that is approximately normal, the confidence of the test data lying in the interval $\mu - N\sigma$ to $\mu + N\sigma$, is about 68.27% for N=1, about 95.45% for N=2, and about 99.73% to N=3. However, as will be discussed below, the selection of N requires consideration of more than maximizing the confidence of sample data lying in the interval $\mu-N\sigma$ to $\mu+N\sigma$.

The magnitude of the calculated statistical range ("$R_{CS}$") is the difference between the upper limit $\mu+N\sigma$ and the lower limit $\mu-N\sigma$, that is, $R_{CS}=2N\sigma$.

While any suitable mathematical function may be utilized, preferably, $C_P$ is a ratio of the actual range ("$R_A$") and the calculated statistical range ("$R_{CS}$"), that is, $C_P=(U-L)/(2N\sigma)$, wherein N is a positive real number.

The selection of a value for N requires not only consideration of the confidence that $N\sigma$ will represent the statistical range of the data, but also that N will generally be selected to provide meaningful results for the data, that is, to allow for some distinction between $C_P$'s for data of the various tests.

Where $C_P$ is being determined from test data, and none of $C_P$, or upper or lower values of the data have been normalized, $C_P>2$ is considered to indicate the test is in statistical control. Thus, preferably, N will generally be selected to provide a raw pre-normalized $C_P>2$. Further, once $C_P$ is normalized, it is desired that there be meaningful distinction between $C_P$'s for data of the various tests.

While the selection of N will vary, it is generally at least 1, preferably at least 2, more preferably at least 3, even more preferably at least 4, still more preferably at least 5, and yet more preferably at least 6. Regarding a range for N, it will preferably range from 1 to 12, more preferably from 2 to 10, more preferably from 2 to 5, and even more preferably from 3 to 4.

The present invention also generally includes determining a value $C_{PK}$, for the data of each test, wherein $C_{PK}$ is a measure of the magnitude of how close the mean $\mu$ of the data is to the closer of the upper or lower limits, preferably normalized to ½ of the magnitude of calculated statistical median. While any suitable mathematical equation could be utilized, preferably, $C_{PK}$ is a ratio of the lesser of $|U-\mu|$ or $|L-\mu|$, to $N\sigma/2$, that is $C_{PK}=\{(\text{lesser of } |U-\mu| \text{ or } |L-\mu|)/(N\sigma/2)\}$.

Where $C_{Pk}$ is being determined from test data, and none of $C_{Pk}$, or upper or lower values of the data have been normalized, $C_{Pk}>2$ is considered to indicate the test is in statistical control.

In the practice of the present invention, where both $C_P>2$ and $C_{Pk}>2$, the test is a candidate for elimination from the testing scheme, or the test may be sampled at a reduced sampling rate. Using the present invention, various "what if" sampling scenarios may be run to determine the proper sampling rate.

In the practice of the present invention, other statistical parameters may also be calculated, non-limiting examples of which include mean, median, standard deviation, maximum, minimum, as well as any others that are desired.

The present invention also generally includes the ability to analyze all or part of the data. For example, it may be desired to analyze all of the data. As another example, it may be desired to analyze only data relating to one or more select bins. For example, a bin 1 selection would be to analyze data only for samples which passed all of the quality control tests. These type of selections on the data may be easily made with commercially available spreadsheet or database software.

Generally, the first pass through the data, it will generally be desired to analyze all of the data. It is usually in subsequent iterations that selections of the data are desired.

Evaluation of Statistical Parameters

The present invention also includes Decision block 30 in which the M tests are evaluated in light of the various statistic parameters determined in statistical analysis block 20.

Once $C_P$ and $C_{PK}$ have been determined, they may be presented in any suitable form. For example, the values of $C_P$ and $C_{PK}$ may be displayed on a screen, printed out, plotted, graphed, or the like.

However, as one of the advantages of the present invention, it is preferred to provide a graphical representation of the analysis as follows. For example, the vertical scale of the graph will be the normalized range, which is preferably between 0 and 1. A vertical representation, for example, line, bar, or series of markings, will have a length $C_P$, with the position of the bar within the normalized limits representing $C_{pk}$, and a marking on the bar indicating the mean. The closer the mean is to the center of the vertical representation, the closer the distribution is to being a normal curve.

In the examples below, a normalization was utilized to calculate the upper and lower limits of the bar graph, and the tick mark, as follows:

Upper Point=$ABS[(\mu+N\sigma-L)/(U-L)]$;

Lower Point=$ABS[(\mu-N\sigma-L)/(U-L)]$; and

Tick Mark=$ABS[(\mu-L)/(U-L)]$;

wherein N=3.

Thus, the height of line represents the normalized $C_P$, with the position of the bar within the normalized limits representing normalized $C_{pk}$, and a marking on the bar indicating the normalized mean.

When you look at a graph as described above, tests that are well within statistical control have short heights (half or less of the distance between 0 and 1), and are well centered between 0 and 1, are good candidates for sampling reduction or elimination. Tests that have large heights (more than half the distance between 0 and 1) or are close to 0 or are close to 1, are not good candidates for sampling reduction or elimination, and perhaps need to be sampled at a greater sampling rate or need adjustment to some other parameter like the limits. If the test is absolutely necessary to check the functionality of the tested object, then it is not a good candidate for sampling rate reduction or elimination.

In the practice of the present invention, the tests may conveniently be ordered and optionally output generated based on the value of $C_p$, from either large to small (i.e., arranged in increasing order of statistical control) or small to large (i.e., arranged in decreasing order of statistical control).

This order based on statistical control allows for easy selection of which tests are the best candidates for elimination or reduction of sampling rate. This order also allows for ease in proposing sampling rates. For example, if the test with largest $C_p$ has a sampling rate of 50%, then the test with the next largest $C_p$ will be sampled at 50% or less, and so on for all the tests. It is recognized that where there are a number of tests, manually changing the sampling rate could be tedious. Thus, According to the present invention, suggested sampling rates may be generated based on any suitable function, non-limiting examples include, arithmetic sampling rate difference between each test (i.e. 3% difference, 50%, 47%, 44%, 41% ... ), percentage sampling rate difference between each test (i.e. 10% difference, 50%, 45%, 40.5%, 36.45% ... ), arithmetic sampling rate difference between each group (i.e. 3% difference every group of 3, 50%, 50%, 50%, 47%, 47%, 47 ... percentage sampling rate difference between each test (i.e. 10% difference every group of 3, 50%, 50%, 50%, 45%, 45%, 45% ... ), or some function that is dependent upon the magnitude of the $C_p$s.

In the practice of the present invention, it is sometimes that case that one of the limits (U or L) is either not specified at all, may be too tight, or too loose. As indicated by the $C_p$ and $C_{pk}$ formulas, U and L values can have a profound effect of the value of $C_p$ and $C_{pk}$. Likewise, the value of the limits can have an effect on the normalized $C_p$ and $C_{pk}$ as viewed on the graph. If a limit is missing or perceived to be the wrong value, one embodiment of the present invention provides the value of the limit can be changed directly on the spreadsheet. Once the value is changed, the graph instantly updates to show a newly calculated bar. Changing the limits can change a good candidate to a bad one or a bad candidate to a good one. Normally, the limits are set initially from a device specification based on the design and process used for the integrated circuit. By changing or tweaking the limits based on actual test statistics, the overall yield can be affected. Limits are generally set to get the best yield without sacrificing quality.

"What If" Scenarios

The present invention also includes "what if" scenario block 40 for changing various parameters of the quality control regimen.

Specifically, in the practice of the present invention, once $C_p$ and $C_{PK}$ have been determined, decisions regarding the M tests of the quality control regimen may be made, including for example, whether each of the tests is in statistical control. For example, test data having a $C_p>2$ represented by a small bar height on the graph, and a $C_{PK}>2$ represented by the bar being well positioned within the range, suggests that the samples generally do not fail the test, and further suggests that it may be possible to remove it from the quality control regimen or decrease its sampling rate.

Of course, just because the calculated $C_P$ and $C_{PK}$ for the data for a certain test suggest it is within statistical control and may be removed or sampled at a does not necessarily mean that it should be removed or its sampling rate decreased. Accordingly, the present invention also includes running a "what if" scenario in which parameters ate varied to determine their effect on the quality control regimen. For example, scenarios may be run after adjusting the upper and/or lower limits for each of the sets of data, and again determining $C_P$ with $C_{PK}$ in view of the adjusted limits. As another example, scenarios may be run in which one or more of the quality control tests is targeted for decreased sampling rate or removal (or to be added back), and then again determining $C_P$ with $C_{PK}$.

In the practice of the present invention, Any number of iterations of this "what if" scenario may be conducted as desired, adding, removing tests, and/or changing the sampling rate between iterations.

EXAMPLE

The following example is provided merely to illustrate one embodiment of the present invention, and this example does not limit the scope of the claims of the invention.

Description of the Data

There are a total of 200 samples that represent a series of 10 tests on 20 integrated circuits. Each test result represents a parametric measurement of current, frequency, voltage, or resistance.

For sake of illustration, this Example represents 20 devices sampled from a total of 200 or a 10% sampling, and included a selected number of 10 tests.

Because the STDF file used in this example is binary format and is generally unreadable as text, FIG. 7 is a spreadsheet showing the raw data after conversion form the STDF file in the method of the present invention. The raw data is listed by device number 1–20 across the rows of the spreadsheet, and the results of each of the 10 tests are listed down the columns. The header information is at the top of the spreadsheet and represents the test description, upper limit, lower limit, units, and scaling factors for each test.

Software Algorithm

For this Example, the method of the present invention was implemented on a personal computer with a windows type operating system using Microsoft Access Database software and Microsoft Excel spreadsheet software.

Figure 3A:
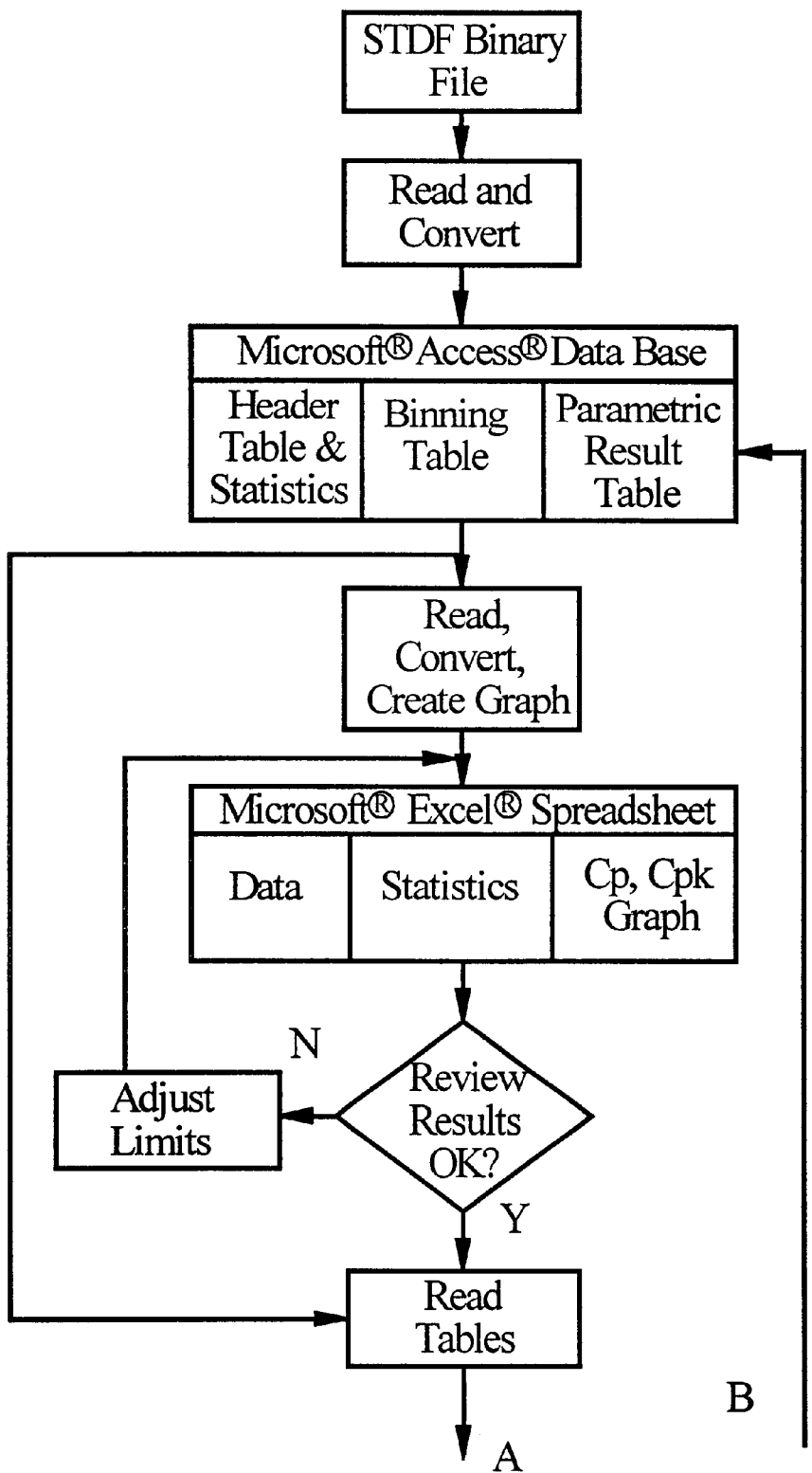
FIG. 3 is a block diagram flowchart of the algorithm of the Example.
Figure 3B:
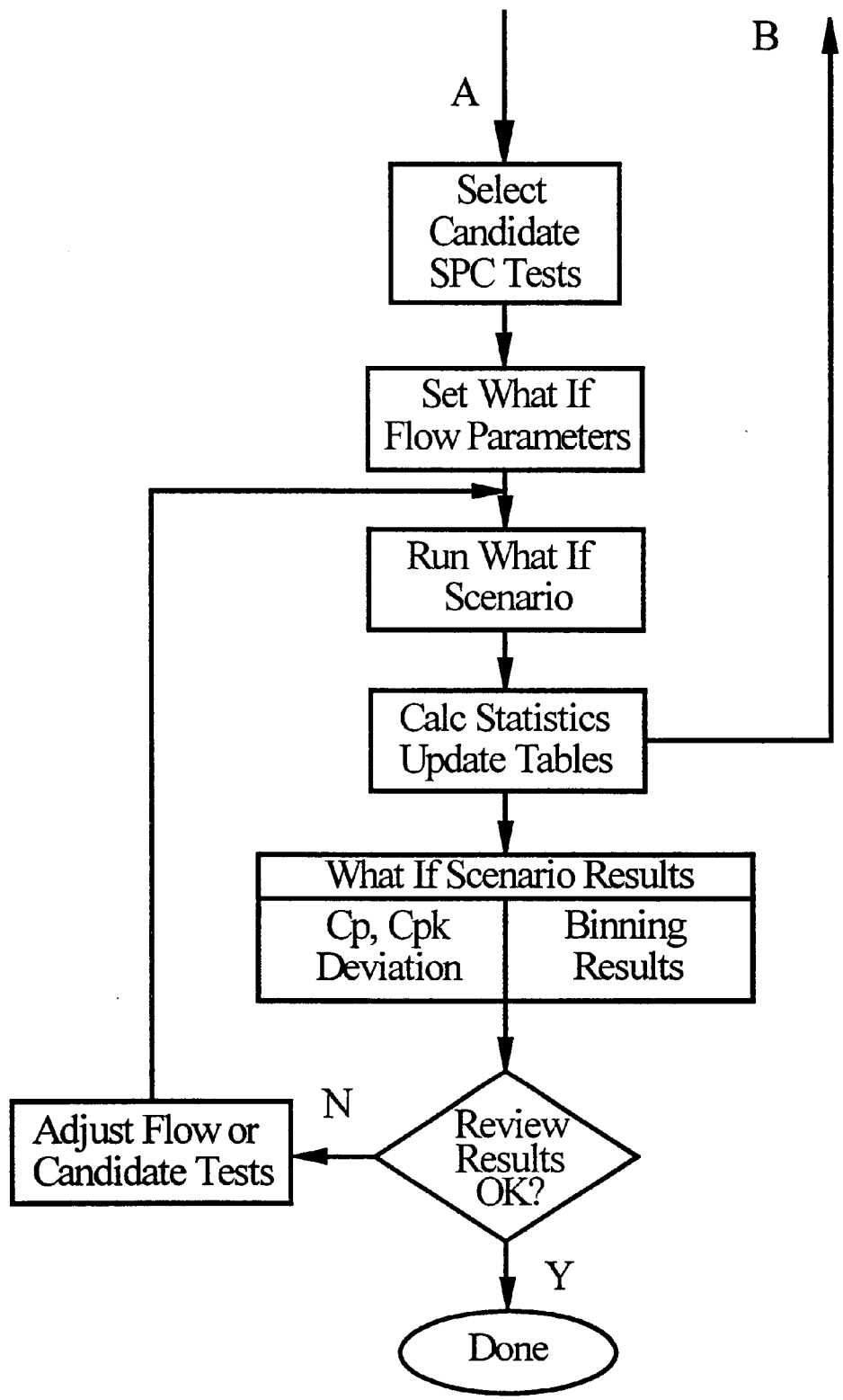

Referring now to FIG. 3, there is shown the algorithm of the present Example in block diagram flow chart form.

Figure 2:
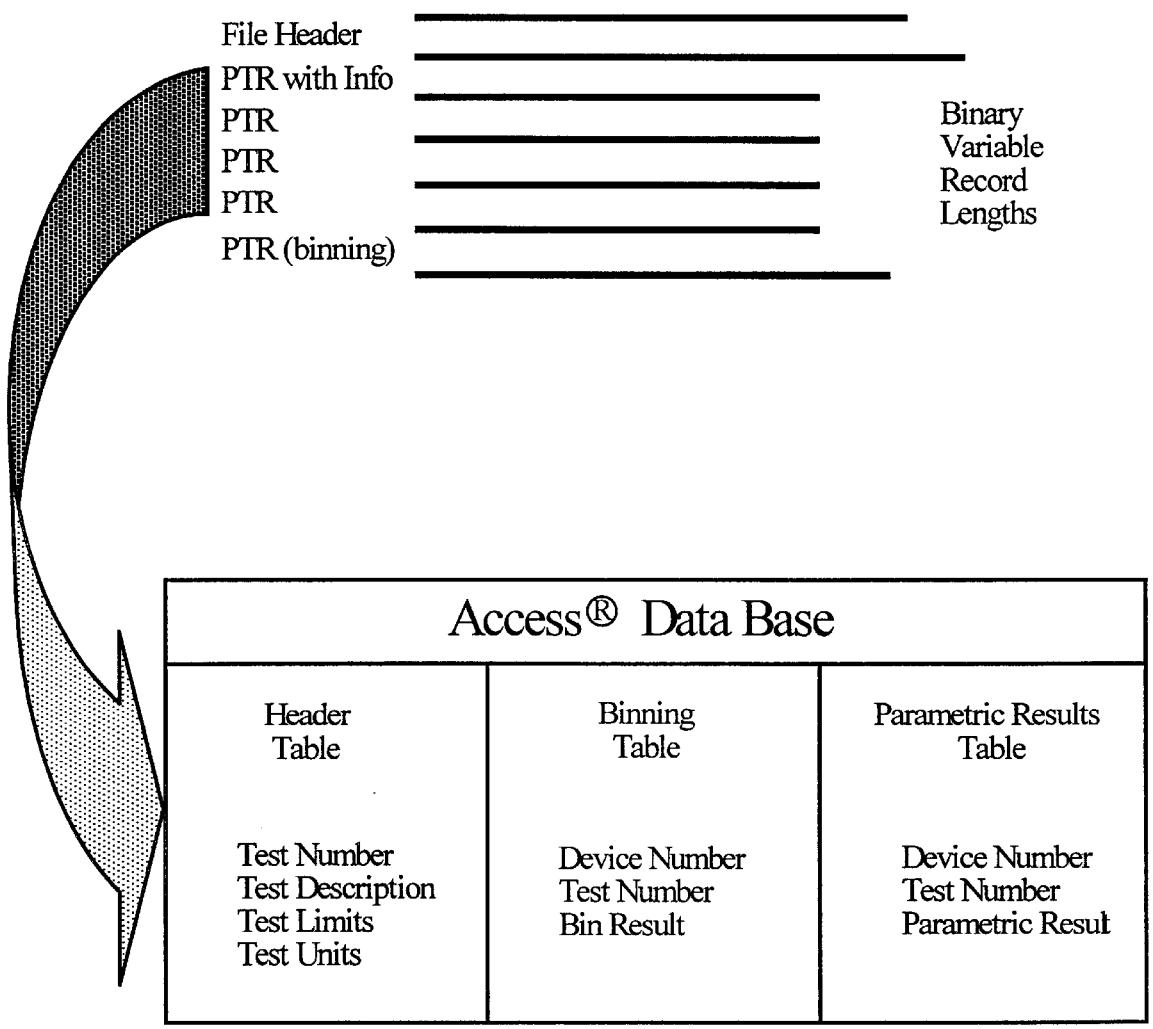
FIG. 2 is a schematic representation showing the conversion of STDF file 100 to header table of FIG. 3, binning table of FIG. 4, and parametric results table of FIG. 5.

Input system 120 reads and converts raw test data contains the data from the STDF conversion as shown in FIG. 2, and as described above, into Microsoft Access database 140 comprising tables as follows: Header Table and Statistics table 141 as shown in FIG. 4, Binning Table 142 as shown in FIG. 5, and Parametric Result Table 143 as shown in FIGS. 6A–D.

Figure 9:
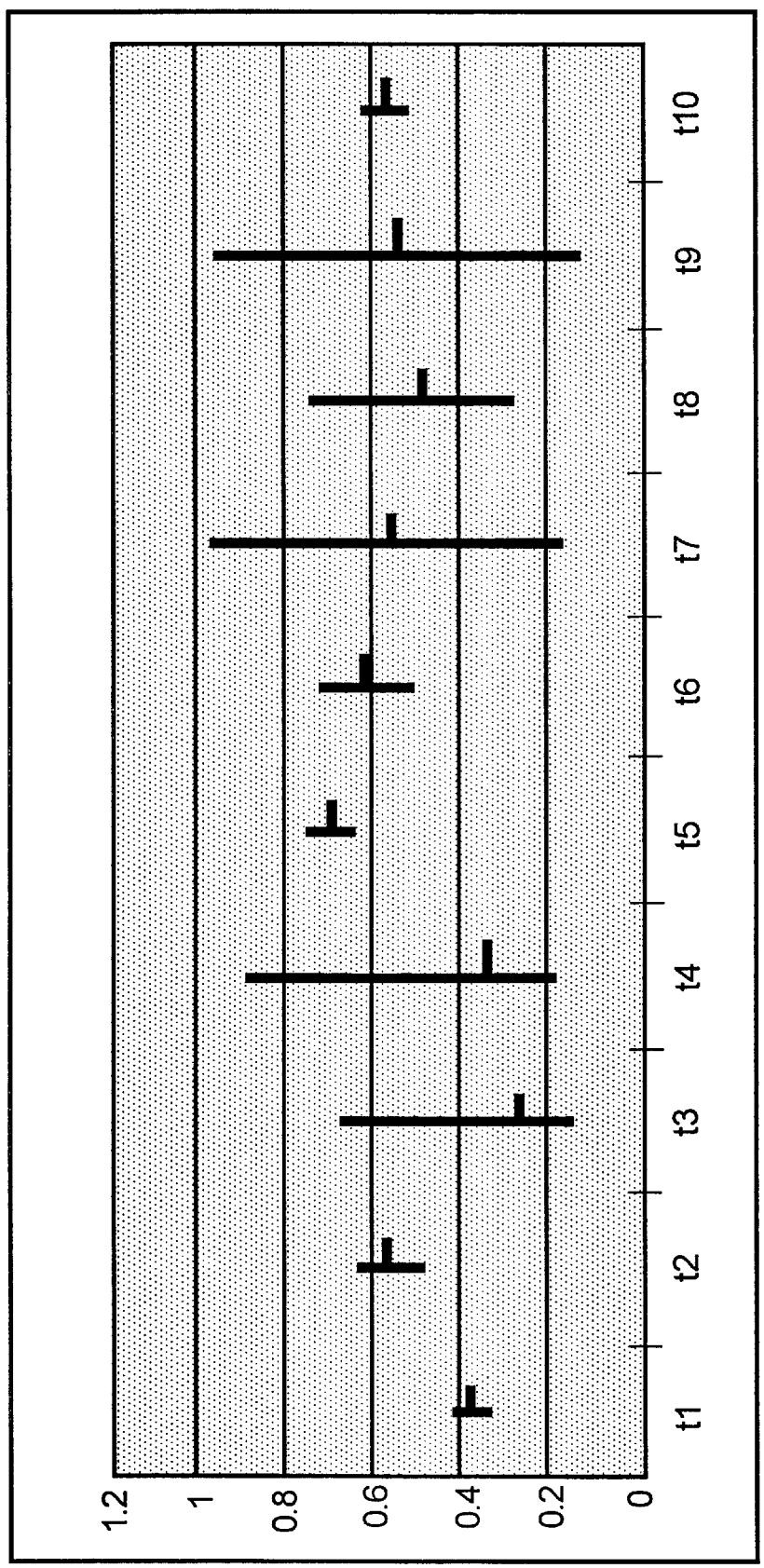
FIG. 9 is $C_P$ & $C_{PK}$ Graph 183 of the Example, after conversion from database 140.

At program block 160, Tables 141, 142 and 143 are converted using Microsoft Excel spreadsheet software 180 into spreadsheets or graphs as follows: Data Spreadsheet 181 as shown in FIG. 7, Statistics Spreadsheet 182 as shown in FIG. 8, and $C_P$ & $C_{PK}$ Graph 183 as shown in FIG. 9. The statistics part of the spreadsheet is in the middle and is labled LSL, USL, Mean, Min, Max, Sigma, Cp, and Cpk. This section calculates the statistics for each test (or column) on all 20 devices. The section labled Norm+3 Sig, Norm–3 Sig, and Norm Mean calculates the normalized values of the top of each bar, the bottom of each bar, and the Mean so that these values can be used to plot the graph. The mean is represented by a tick mark on each bar.

Program flow then goes to Decision Block 200 for review of the results to see if the results are acceptable, that is, do the statistics fit the data (rather than are the tests within statistical control which will be asked later).

In a normal case, each of the bars on the graph should lie between the normalized lower and upper limits (0 and 1 respectfully). If any given bar does not lie between 0 and 1, this indicates there may be a problem with the original data, or a limit is missing, or a limit is not set correctly, or some of the data is outside the limits (indicating a failure in the device being tested)

If the results are not acceptable, then program flow goes to Adjust Limit block 220 where the limits are adjusted and program flow returned to blocks 160 and 180 to regenerate the spreadsheets and graphs.

If the data for a given test looks normal (expected result), the problem is most likely one or both limits. Any limit (L or U) for any test can be changed directly on the spreadsheet and the graph will immediately update to reflect the change. The results in the spreadheet shown are all OK.

Once the results are acceptable (either initially, or after one or more iterations after limit adjustment), then program control goes to candidate selection block 260 and Set What If Parameters block 280 to select which tests might be candidates for sampling rate adjustment (up or down, or maybe removal) from the quality control regimen, and to set the parameters for the "What If" scenario.

To select candidates for removal or smaller sampling, the bar on the graph for these test should be small (usually less than half the height from 0 to 1) and should be fairly well centered between 0 and 1. These bars represent tests that have a Cp and Cpk>2 which indicates they are in statistical control. In the example, test 1,2,5,6, and 10 are certainly good candidates. Tests 3 and 8 may also be good candidates, although test 3 has an offset mean indicating that the data may not follow a normal curve distribution. Test 4 is not a good candidate, since it's height nearly fills the space from 0 to 1 indicating a low Cp and it is very close to the 0 (normalized lower limit) indicating that te Cpk is very low. Likewise, tests 7 and 9 are too close to the upper limit.

Figure 12:
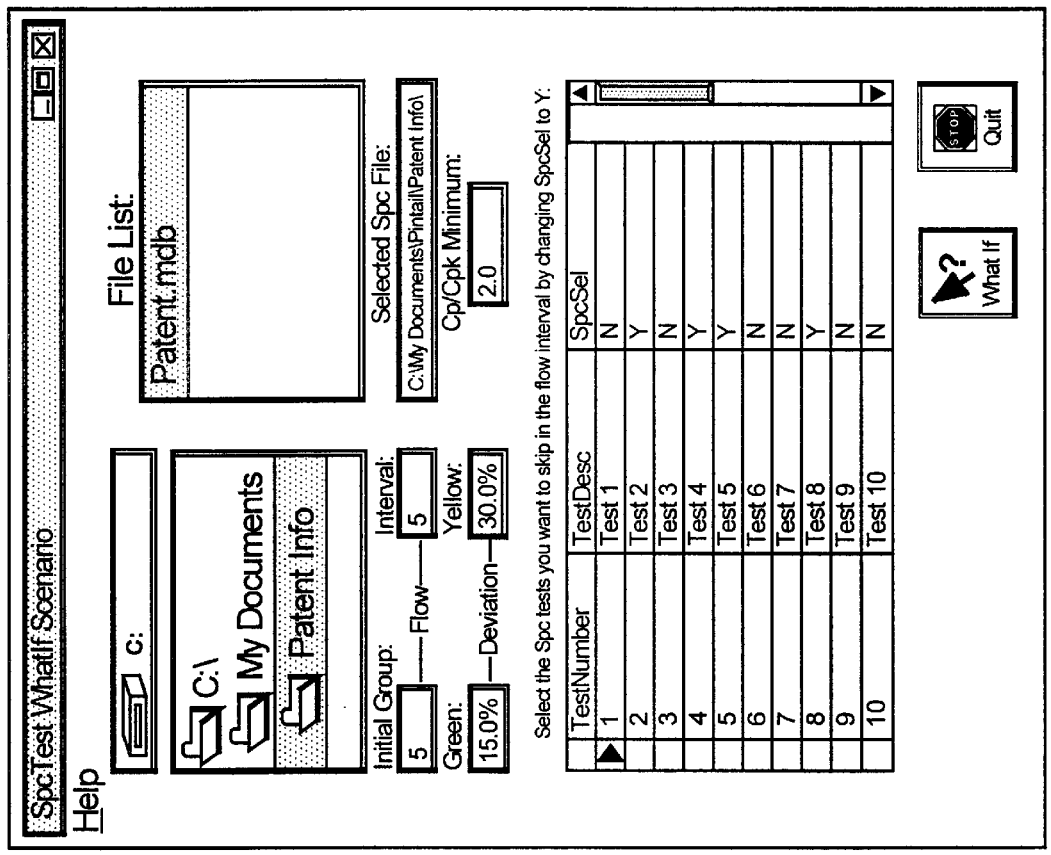
FIG. 12 is a "What If" scenario setup.

Referring now to FIG. 12, there is shown the "What if" scenario setup.

The flow parameters for the What if Scenario are setup in block 280 of the flow diagram. In this example, the minimum Cp and Cpk was set to 2.0. This means that a selected test must have a minimum Cp and Cpk of 2.0. The green and yellow parameters are set for conveniently viewing the What if results. The green parameter allows a specified % deviation of Cp or Cpk from the original 100% test to the What if scenario (skipping every 5 devices). If the deviation of Cp and Cpk is less than the percent specified, the software colors the result row for that test green to enhance viewing. It also puts a "G" in the What if results table for that test. Likewise, the yellow parameter is usually set to a higher percentage than the green (meaning check this test carefully). The Whatif results row for the test is colored Red if the percent deviation is greater than the green of red set percentage deviations (meaning, this is probably not a good candidate). In this example, Green was set to 15% and Yellow was set to 30%.

In the present Example, the following candidates were selected: Test Nos. 2, 4, 5, and 8. Even though Test 4 was not considered a good candidate, it was chosen to illustrate the binning change output of the What if scenario.

The initial group was set to 5 and calculates the base line statistics for Cp and Cpk. The interval was also set to 5. The interval sets how many devices to skip (after the initial group) before taking another sample and only refers to the candidate SPC tests selected. So, in this example, the first 5 devices are tested 100% using all 10 tests, then tests 2, 4, 5 and 8 are skipped on the next 5 devices (6–10), then device 11 is again 100% tested, and so on.

Program flow then goes to block 300 and block 320 to execute the "What If Scenario," and update the tables. Results for the scenario are the provided in block 340.

Figure 10:
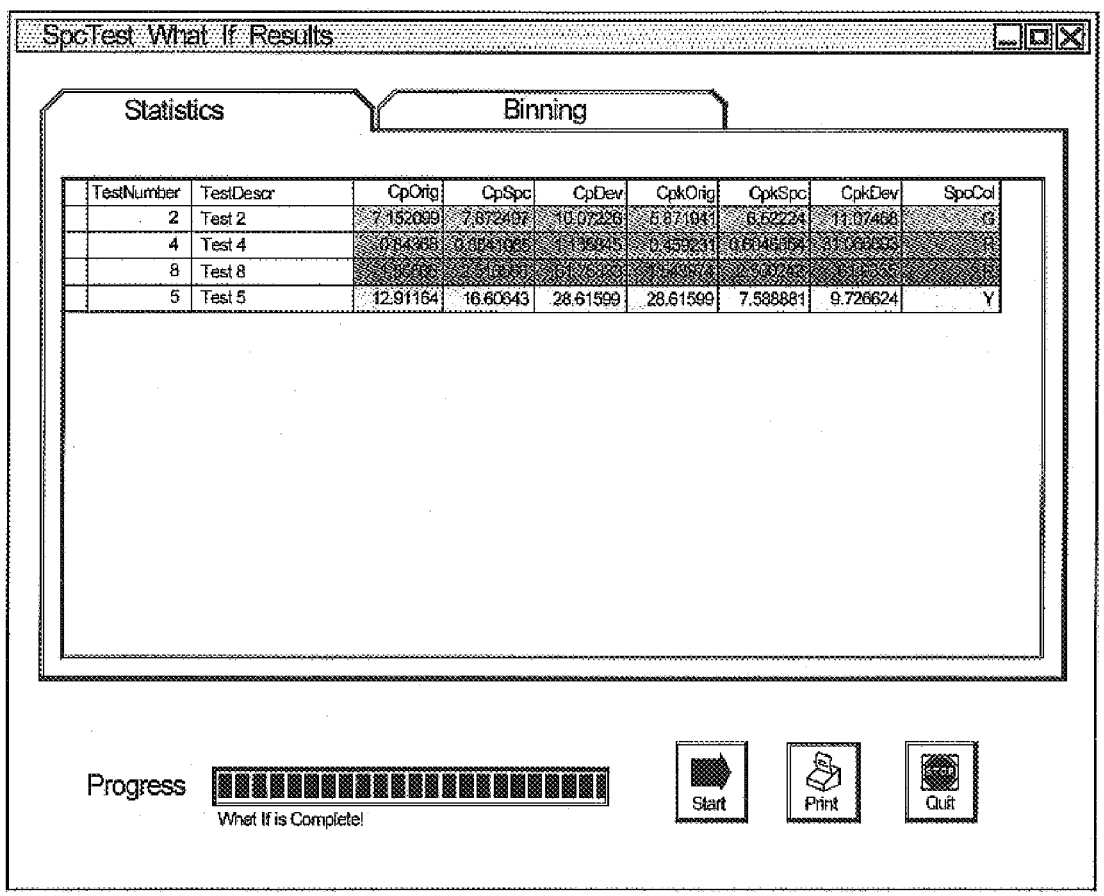
FIG. 10 is $C_P$ & $C_{PK}$ deviation table 341 of the Example, after running "What If" scenario.
Figure 11:
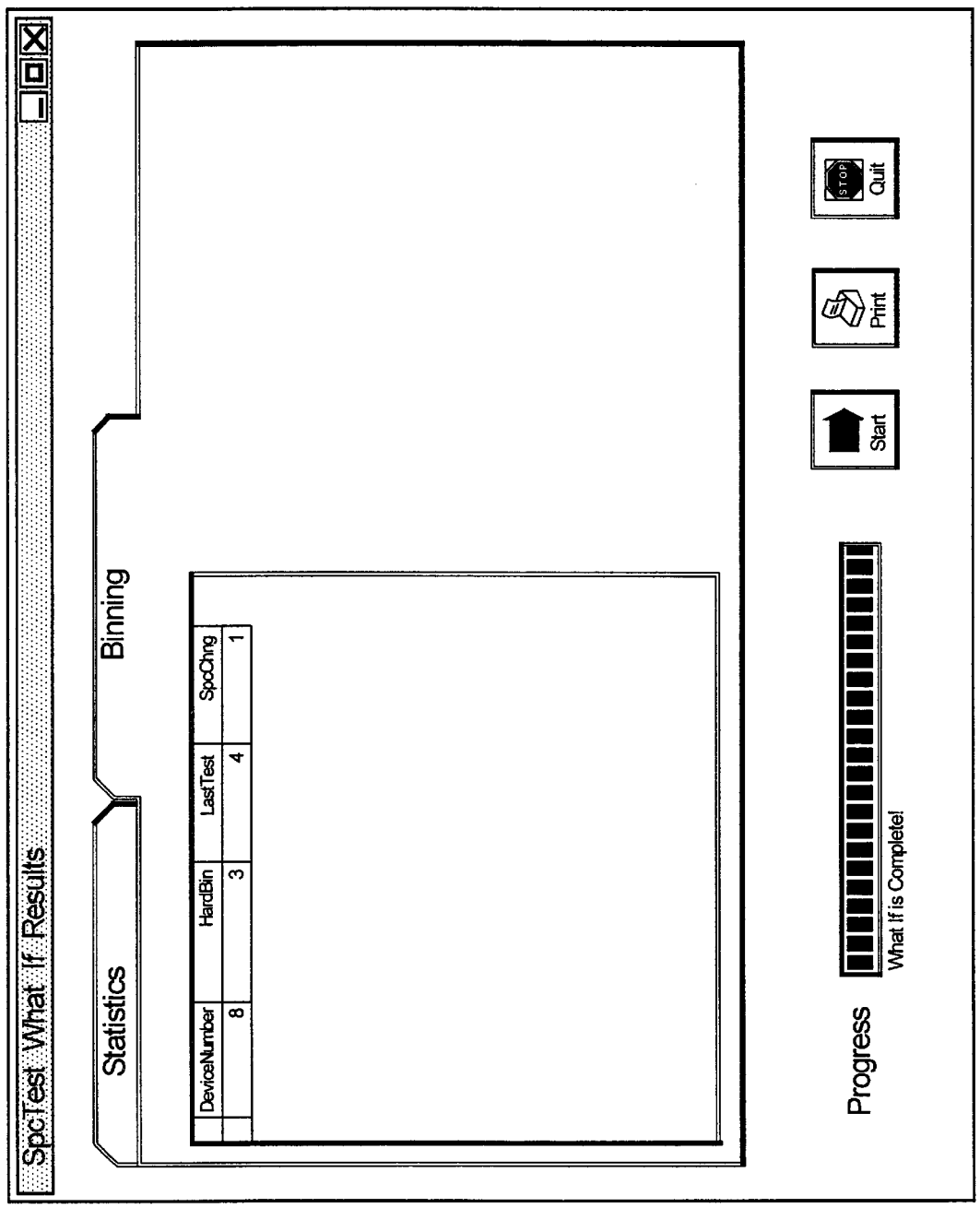
FIG. 11 is Binning result table 342 of the Example, after running "What If" scenario.

Referring now to FIGS. 10 and 11 there are shown after running the "What If" scenario $C_P$ & $C_{PK}$, deviation table 341 and Binning result table 342.

Since there were only 20 devices tested, the sample size is already small, which is why the initial group was set to 5 and the interval was set to 5. On larger sets of data (typically thousands of devices), the initial group is normally set to 50 or more, and the interval is increased to 25 or more. Again, since there are only 20 devices in this example, the green parameter was set to 15% and the yellow was set to 30%. In larger sets of data, green is typically set to 2% and yellow to 15%. All of the setup parameters may have to be adjusted depending on the amount of data and the values of the statistics. However, the Whatif scenario easily allows this. FIG. 10, a spreadsheet like data grid shows the results of the What if scenario for this example. The Test Number column shows which tests were selected. The StDev, Mean, CpOrig, and CpkOrig show the original statistics from 100% testing on all 20 devices. CpSpc and CpkSpc show the newly calculated results from running the whatif scenario. CpDev and CpkDev show the percent deviation from 100% testing v. running the scenario. SpcCol shows the color as G,Y, or R for Green, Yellow, or Red. On the actual software display, these are shown in color.

Program flow then goes to decision block 360 for review of the "What If" scenario results, and for binning changes. On the binning table, FIG. 11, if there are any binning changes after running the scenario, a 1 is placed in the column labeled SpcChng. If there are no changes, a 0 is placed in this column. In this example, there was a binning change on device number 8 on test number 4.

If the results are "OK", then the analysis is "done." If the results are not acceptable, program flow goes to Adjust block 380 for further refinement of the "What If" scenarios. There may be as many iterations through the "What IF" scenarios as are desired.

The present invention is believed to find applicability with any application, process, procedure, product, and the like, with which statistical models are utilized to predict actual outcomes. Very commonly, the present invention will find utility where there are a number of test or quality control procedures for predicting quality, for example, as non-limiting examples, in the manufacture or production of aircraft, analytical instruments, automobiles, automobile parts, bottled or canned beverages, building materials, cameras, chemicals, clothing, computers, computer software, electronic components, electronic devices, machinery, medical instruments, packaged foods, pharmaceuticals, printing, satellites, sewage treatment, tools, or toys.

The present invention may also find utility in analyzing any sort of statistical model, especially those that depend upon input from multiple variables, non-limiting examples of which such as weather forecast models; management models; supply chain management models; economic forecast models; stock, bond, or commodity models; behavior prediction or human performance prediction models; seismic data models; telecommunication data models; monitoring of teaching methods models; war game scenario models; sports outcome prediction models useful for coaches or with legalized gambling; physical fitness program models; diet models; inmate rehabilitation models; election return models; correlation of lower life form efficacy data or model efficacy data to humans in the testing of pharmaceuticals; germ or viral strain mutation prediction models; medical treatment models to maximize treatment, and the like.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A method for analyzing a quality control regimen comprising M quality control tests $T_i$ wherein i is=M a finite positive integer$\geq$1, wherein each quality control test $T_i$ is applied to a population P at a sampling rate $R_i$ generating test data $D_i$, the method comprising:

(a) determining for each of the quality control tests $T_i$, a $C_{Pi}$ and $C_{PKi}$, wherein $C_{pi}$ is a measure of the spread of data $D_i$, and wherein $C_{PK}$ is a measure of the magnitude of how close $\mu_i$ is to the closer of $U_i$ or $L_i$, wherein $U_i$, $L_i$, and $\mu_i$, are repectively, the upper limit, lower limit, and mean for $D_i$;

(b) adjusting one or more of $R_i$, $U_i$ or $L_i$, for at least one of the tests $T_i$.

2. The method of claim 1 further comprising:

(c) repeating step (a).

3. The method of claim 1 further comprising:

(c) repeating steps (a) and (b), until $C_{pi}$ and $C_{pki}$ are at desired values.

4. The method of claim 1, wherein $C_{pi}=(U_i-L_i)/(2N\sigma_i)$ and $C_{PKi}=\{[(\text{lesser of } |U_i-\mu_i| \text{ or } |L_i-\mu_i|)]/(N\sigma_i/2)\}$, wherein $\sigma_i$ is a standard deviation for $D_i$.

5. The method of claim 4, wherein step (b) comprises adjusting $R_i$ for at least one of the tests $T_i$.

6. The method of claim 5, wherein step (b) comprises adjusting $R_i$ to 0% for at least one of the tests $T_i$.

7. The method of claim 4, further comprising ordering tests $T_i$ based on the magnitude of $C_{pi}$.

8. The method of claim 4, further comprising graphically displaying $C_{Pi}$ and $C_{PKi}$, with the magnitude of $C_{pi}$ represented by a bar graph, with the magnitude of $C_{PKi}$ represented as a position of the bar on the graph, and with $\mu_i$ represented as a marking on the bar.

9. The method of claim 4 further comprising:

(c) repeating step (a).

10. The method of claim 4 further comprising:

(c) repeating steps (a) and (b), until $C_{pi}$ and $C_{pki}$ are at desired values.

11. An apparatus for analyzing a quality control regimen comprising M quality control tests $T_i$ wherein i is=M a finite positive integer$\geq$1, wherein each quality control test $T_i$ is applied to a population P at a sampling rate $R_i$ generating test data $D_i$, the apparatus comprising:

(a) a processor provided with instructions that when executed cause the processor to determine for each of the quality control tests $T_i$, a $C_{Pi}$ and $C_{PKi}$, wherein $C_{pi}$ is a measure of the spread of data $D_i$, and wherein $C_{PK}$ is a measure of the magnitude of how close $\mu_i$ is to the closer of $U_i$ or $L_i$, wherein $U_i$, $L_i$, and $\mu_i$, are repectively, the upper limit, lower limit, and mean for $D_i$;

(b) input device for providing to the processor updated values for one or more of $R_i$, $U_i$ or $L_i$, for at least one of the tests $T_i$.

12. The apparatus of claim 11, wherein the instructions when executed further cause the processor to determine for each of the quality control tests $T_i$, updated values for $C_{Pi}$ and $C_{PKi}$, based on updated values for one or more of $R_i$, $U_i$ or $L_i$.

13. The apparatus of claim 11, wherein the instructions when executed further cause the processor to repeatedly update values for $C_{Pi}$ and $C_{PKi}$, based on updated values for one or more of $R_i$, $U_i$ or $L_i$, until the updated values for $C_{pi}$ and $C_{pki}$ reach a desired value.

14. The apparatus of claim 11, wherein $C_{pi}=(U_i-L_i)/(2N\sigma_i)$ and $C_{PKi}=\{[(\text{lesser of } |U_i-\mu_i| \text{ or } |L_i-\mu_i|)]/(N\sigma_i/2)\}$, wherein $\sigma_i$ is a standard deviation for $D_i$.

15. The apparatus of claim 14, wherein (b) comprises an input device for providing the processor with updated $R_i$ for at least one of the tests $T_i$.

16. The apparatus of claim 14, wherein the instructions when executed further cause the processor to order tests $T_i$ based on the magnitude of $C_{pi}$.

17. The apparatus of claim 14, further comprising an output device for graphically displaying $C_{Pi}$ and $C_{PKi}$, with the magnitude of $C_{pi}$ represented by a bar graph, with the magnitude of $C_{PKi}$ represented as a position of the bar on the graph, and with $\mu_i$ represented as a marking on the bar.

18. The apparatus of claim 14, wherein the instructions when executed further cause the processor to determine for each of the quality control tests $T_i$, updated values for $C_{Pi}$ and $C_{PKi}$, based on updated values for one or more of $R_i$, $U_i$ or $L_i$.

19. The apparatus of claim 14, wherein the instructions when executed further cause the processor to repeatedly update values for $C_{Pi}$ and $C_{PKi}$, based on updated values for one or more of $R_i$, $U_i$ or $L_i$, until the updated values for $C_{pi}$ and $C_{pki}$ reach a desired value.

20. A computer-readable storage medium having stored thereon a plurality of instructions for analyzing a quality control regimen comprising M quality control tests $T_i$ wherein i is=M a finite positive integer$\geq$1, wherein each quality control test $T_i$ is applied to a population P at a sampling rate $R_i$ generating test data $D_i$, the instructions comprising:

(a) instructions to determine for each of the quality control tests $T_i$, a $C_{Pi}$ and $C_{PKi}$ wherein $C_{pi}$ is a measure of the spread of data $D_i$, and wherein $C_{PK}$ is a measure of the magnitude of how close $\mu_i$ is to the closer of $U_i$ or $L_i$, wherein $U_i$, $L_i$, and $\mu_i$, are repectively, the upper limit, lower limit, and mean for $D_i$;

(b) instructions for providing to the processor updated values for one or more of $R_i$, $U_i$ or $L_i$, for at least one of the tests $T_i$.

21. The medium of claim 20, wherein $C_{pi}=(U_i-L_i)/(2N\sigma_i)$ and $C_{PKi}=\{[(\text{lesser of } |U_i-\mu_i| \text{ or } |L_i-\mu_i|)]/(N\sigma_i/2)\}$, wherein $\sigma_i$ is a standard deviation for $D_i$.

22. The medium of claim 21, further comprising instructions for providing the processor with updated $R_i$ for at least one of the tests $T_i$.

23. The medium of claim 21, further comprising instructions to order tests $T_i$ based on the magnitude of $C_{pi}$.

24. The medium of claim 21, further comprising instructions for graphically displaying $C_{Pi}$ and $C_{PKi}$, with the magnitude of $C_{pi}$ represented by a bar graph, with the magnitude of $C_{PKi}$ represented as a position of the bar on the graph, and with $\mu_i$ represented as a marking on the bar.

25. The medium of claim 21, further comprising instructions to determine for each of the quality control tests $T_i$, updated values for $C_{Pi}$ and $C_{PKi}$, based on updated values for one or more of $R_i$, $U_i$ or $L_i$.

26. The medium of claim 21 further comprising instructions to repeatedly update values for $C_{Pi}$ and $C_{PKi}$, based on updated values for one or more of $R_i$, $U_i$ or $L_i$, until the updated values for $C_{pi}$ and $C_{pki}$ reach a desired value.

27. A propagated signal comprising a plurality of instructions for analyzing a quality control regimen comprising M quality control tests $T_i$ wherein i is=M a finite positive integer$\geq$1, wherein each quality control test $T_i$ is applied to a population P at a sampling rate $R_i$ generating test data $D_i$, the instructions comprising:

(a) instructions to determine for each of the quality control tests $T_i$, a $C_{Pi}$ and $C_{PKi}$ wherein $C_{pi}$ *is a measure of the spread of data $D_i$*, and wherein $C_{PK}$ is a measure of the magnitude of how close $\mu_i$ is to the closer of $U_i$ or $L_i$, wherein $U_i$, $L_i$, and $\mu_i$, are repectively, the upper limit, lower limit, and mean for $D_i$;

(b) instructions for providing to the processor updated values for one or more of $R_i$, $U_i$ or $L_i$, for at is least one of the tests $T_i$.

28. The signal of claim 27, wherein $C_{pi}=(U_i-L_i)/(2N\sigma_i)$ and $C_{PKi}=\{[(\text{lesser of } |U_i-\mu_i| \text{ or } |L_i-\mu_i|)]/(N\sigma_i/2)\}$, wherein $\sigma_i$ is a standard deviation for $D_i$.

29. The signal of claim 27, further comprising instructions for providing the processor with updated $R_i$ for at least one of the tests $T_i$.

30. The signal of claim 27, further comprising instructions to order tests $T_i$ based on the magnitude of $C_{pi}$.

31. The signal of claim 27, further comprising instructions for graphically displaying $C_{Pi}$ and $C_{PKi}$, with the magnitude of $C_{pi}$ represented by a bar graph, with the magnitude of $C_{PKi}$ represented as a position of the bar on the graph, and with $\mu_i$ represented as a marking on the bar.

32. The signal of claim 27, further comprising instructions to determine for each of the quality control tests $T_i$, updated values for $C_{Pi}$ and $C_{PKi}$, based on updated values for one or more of $R_i$, $U_i$ or $L_i$.

33. The signal of claim 27 further comprising instructions to repeatedly update values for $C_{Pi}$ and $C_{PKi}$, based on updated values for one or more of $R_i$, $U_i$ or $L_i$, until the updated values for $C_{pi}$ and $C_{pki}$ reach a desired value.

* * * * *